(12) United States Patent
Boudard

(10) Patent No.: US 6,364,259 B1
(45) Date of Patent: Apr. 2, 2002

(54) TRIPOD PLATE

(76) Inventor: Pierre Boudard, Gabriel-von-Seidel Str., Grünwald (DE), 82031

( * ) Notice: Subject to any disclaimer, the term of this patent is extended or adjusted under 35 U.S.C. 154(b) by 0 days.

(21) Appl. No.: 09/656,357

(22) Filed: Sep. 6, 2000

(30) Foreign Application Priority Data

Sep. 8, 1999 (DE) .......................................... 199 42 925
Sep. 8, 1999 (DE) .......................................... 199 42 924

(51) Int. Cl.[7] .............................................. F16M 11/04
(52) U.S. Cl. ............................. 248/187.1; 248/177.1; 396/419
(58) Field of Search ...................... 248/187.1, 177.1, 248/544, 681; 396/419, 425, 428

(56) References Cited

U.S. PATENT DOCUMENTS

| | | | | |
|---|---|---|---|---|
| 5,119,203 A | * | 6/1992 | Hosaka et al. .............. | 358/229 |
| 5,429,332 A | * | 7/1995 | Ishikawa .................. | 248/187.1 |
| 5,810,313 A | * | 9/1998 | Armstrong ............... | 248/346.2 |
| 5,870,641 A | * | 2/1999 | Chrosziel ............. | 248/187.1 X |
| 6,196,504 B1 | * | 3/2001 | Lemke ..................... | 248/187.1 |

FOREIGN PATENT DOCUMENTS

DE  296 13 027 U1  9/1996

* cited by examiner

Primary Examiner—Ramon O. Ramirez
(74) Attorney, Agent, or Firm—Darby & Darby

(57) ABSTRACT

It is the object of the present invention to accelerate and simplify the mechanical fixation of a camera to a tripod plate. To this end a camera is first mounted with one end on the tripod plate. The camera is held at said end of the tripod plate such that it can carry out substantially only a rotational movement around the holding point. Finally, the camera is fixed by an automatic locking means when being mounted at its rear end.

16 Claims, 9 Drawing Sheets

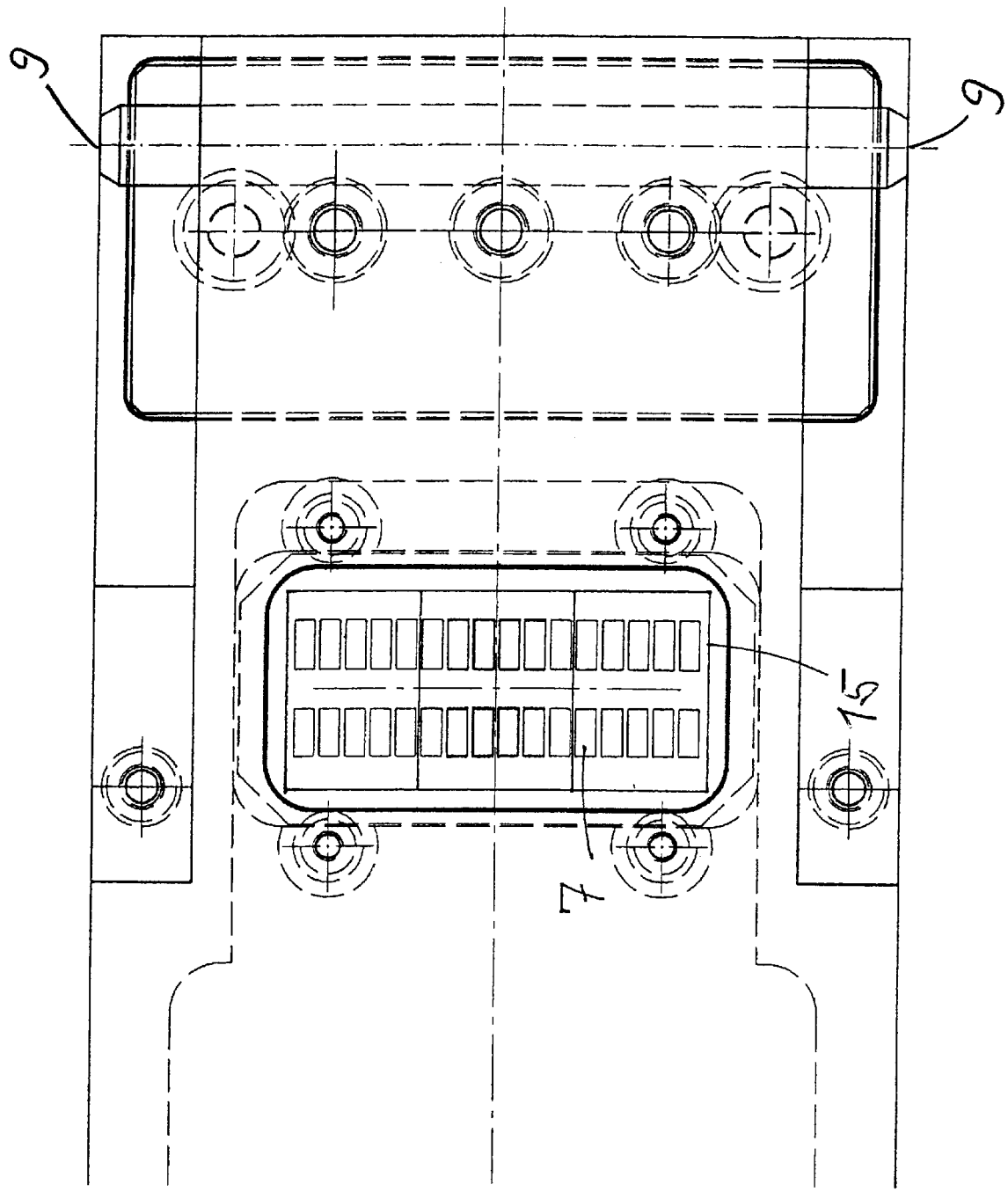

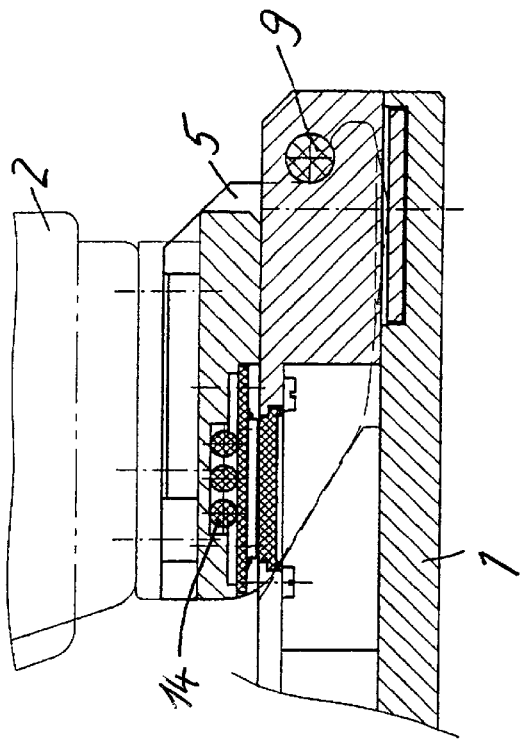
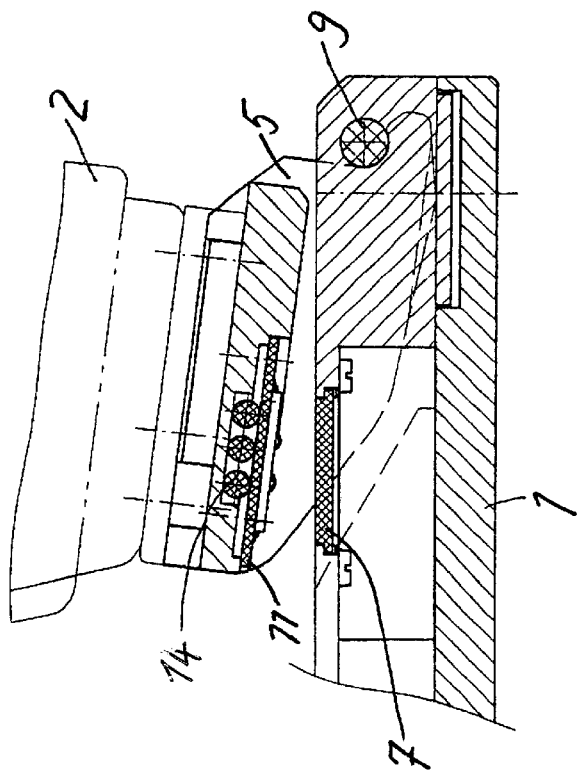

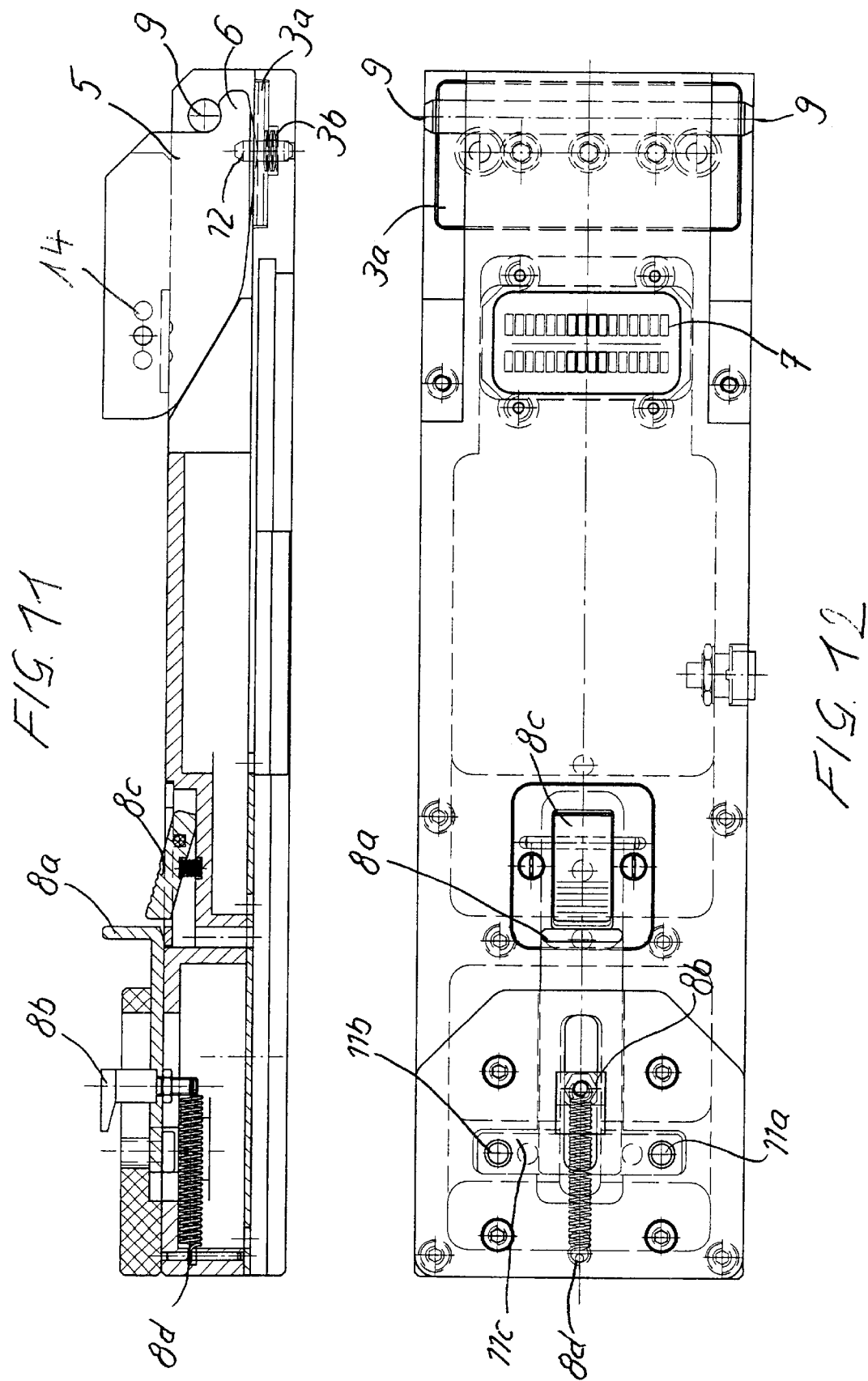

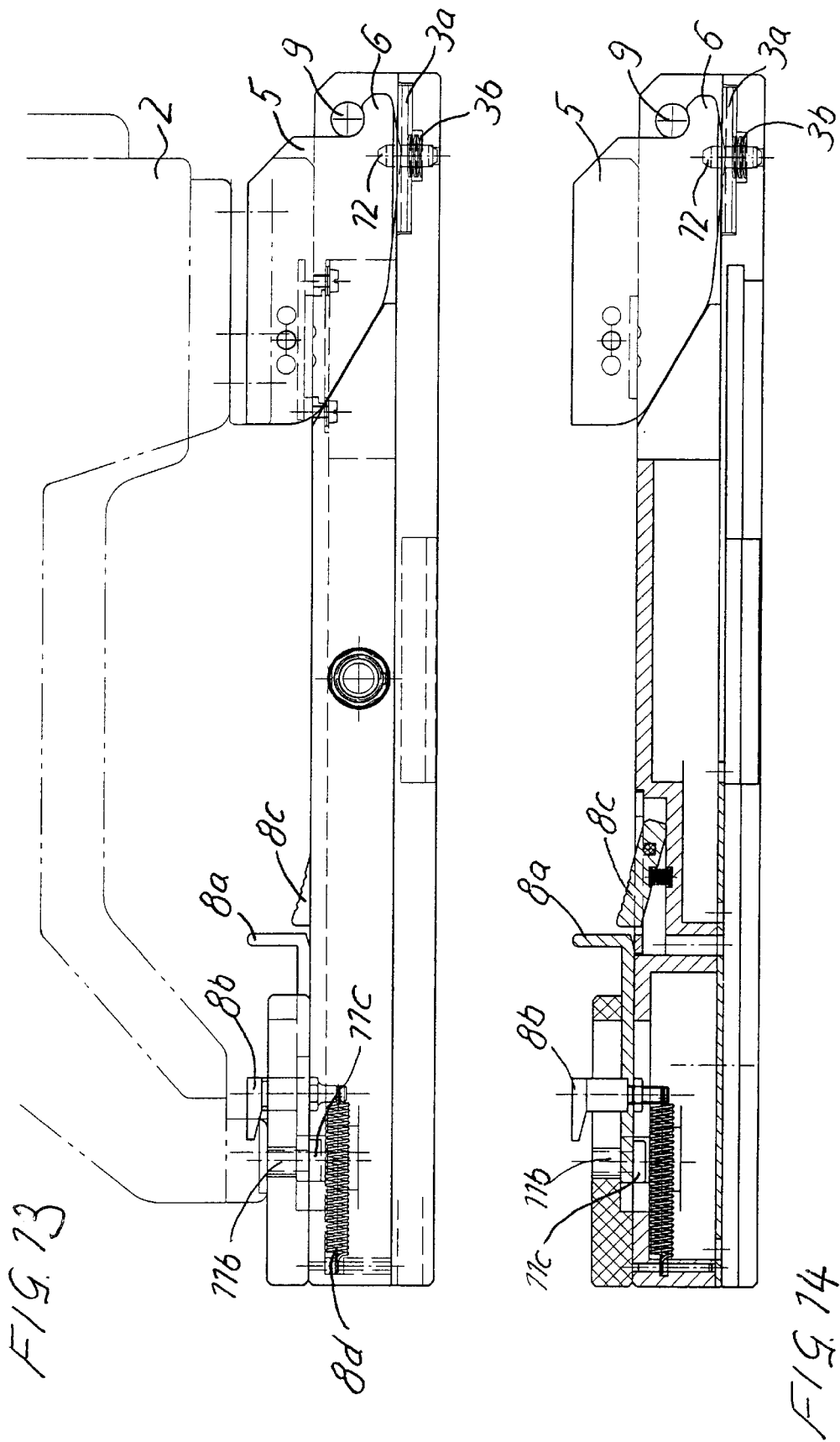

FIG. 75
A
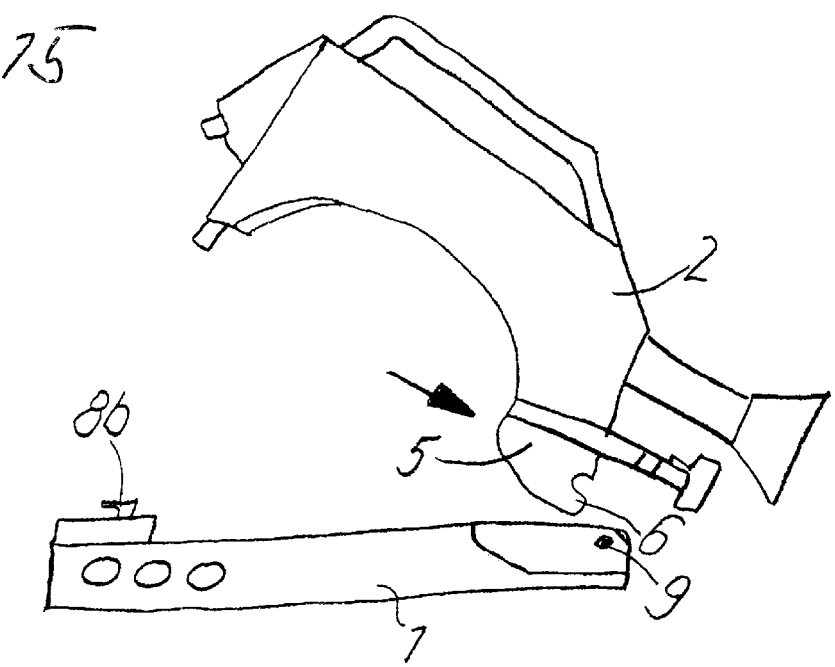
B
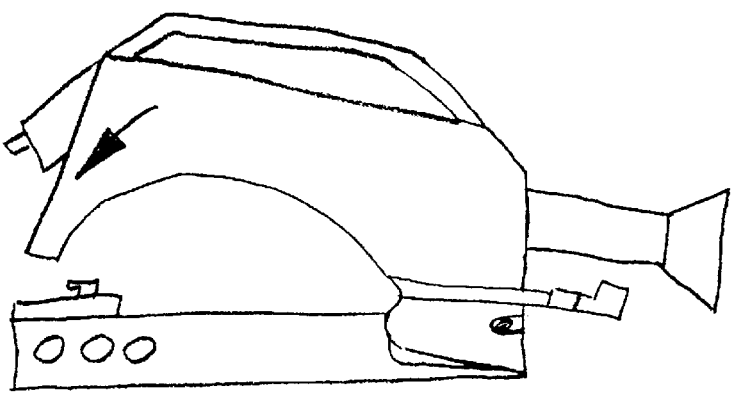
C
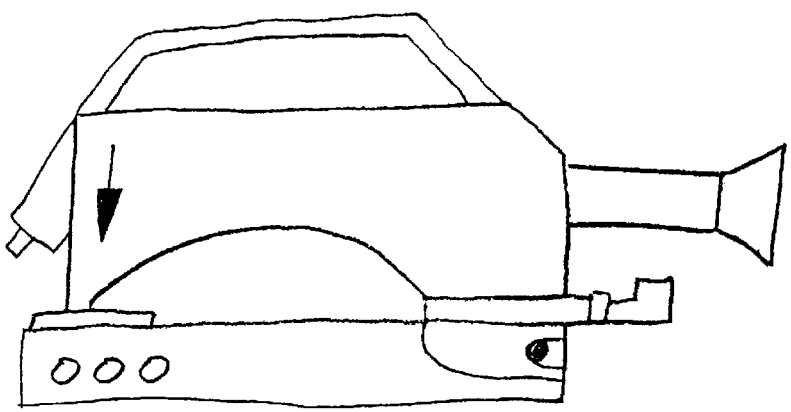

TRIPOD PLATE

FIELD OF THE INVENTION

The present invention relates to a tripod plate, a tripod, a portable camera, a connection element for connecting a portable camera to a tripod plate and an interface system for mechanically fastening a camera. Portable cameras can be fixedly connected to a tripod or a pan head of a camera via such a mechanical interface, the so-called tripod plate.

BACKGROUND OF THE INVENTION

Tripod plates serve, in particular, to mechanically fix portable cameras within a short period of time. A rapid mechanical fixation of a camera is needed for the flexible use of portable cameras.

As a rule, the demands made on portable cameras are contradictory. On the one hand, they should have a weight that is as small as possible to be suited for mobile use. This, however, additionally requires a separate recording device and a separate power supply for the cameras. Portable video cameras for professional uses, the so-called broadcast cameras, normally have a weight ranging from 5 to 12 kilograms.

In contrast to the portable cameras used in the consumer field, very high demands are made on the image quality, in particular the resolution of the recorded video signal, in broadcast cameras. As for the quality of the video signals to be recorded, a rough distinction can be made between the following levels: VHS quality, distribution quality and contribution quality. In the consumer field the attempt is made to achieve— with a minimum number of means—a video signal quality that, if possible, should be better than that of VHS video recorders.

In the professional field a distinction is made between distribution and contribution quality. While video signals used for "distribution", i.e. for broadcasting to TV viewers, have a much better picture quality than the VHS quality, video signals suited for "contribution" have to meet even higher demands. An important use for portable professional video cameras is ENG (electronic news gathering). In ENG shots are taken by camera teams on the spot, for instance for newscasts. These are later compiled or edited for a newscast and then broadcast. A further application for portable video cameras with high quality demands is EFP (electronic field production). In both cases, high demands are made on the quality of the video signals, in particular the resolution, because the video signals have often to pass through several image processing stages after shooting. Normally, in post-production stages image sequences are newly edited, cross-faded, cut, subtitled, etc. As a rule, each of these stages will deteriorate the quality of the image signal. To guarantee a specific minimum quality level for the image signals which are broadcast to the TV viewer in the end, i.e. the distribution quality, special demands must be made on the shots.

The enhanced image quality produces a considerably larger video signal flow than is standard with image signals in the consumer field. As a rule, the recording methods used in consumer devices for the video signal are not suited for the professional field. Special recording formats have become accepted as magnetic recording methods for the broadcasting field. These derive from four basic forms: 1. analog composite, 2. analog components, 3. digital composite, 4. digital components. Digital recording formats are increasingly used. The digital composite signal is a digitalization of the analog composite color video signal. To this end the video signal is normally scanned and quantized with a multiple of the color subcarrier frequency. Such digital magnetic recording formats include, e.g., the D2 format (of Ampex and Sony) and the D3 format (of Panasonic). An improved image quality can be achieved with the digital component technique. The analog component signals (RGB) are here encoded digitally. Such magnetic recording standards include, e.g., the Digital Betacam format (of Sony) or the magnetic recording format D6 (of Panasonic).

The recording of video signals on magnetic disks, in particular hard disks, as are used in every PC, gains more and more importance because of its increased storage capacity. This recording medium has the advantage that it can be used much more easily together with electronic post-production devices, for instance computer-aided cutting devices (non-linear editing).

The great variety of recording formats often requires a conversion into one or several of the other recording formats, depending on the respective use.

The recording capacity of the recording device within the portable camera is limited, in particular because of the small dimensions of the camera. During mobile use, coupling to an external recording device is virtually impossible. During stationary use, however, an external recording device is often used. That is why portable video cameras have external connections to provide the video signal for external recording.

During the mobile use of such a camera, the camera requires not only a recording device of its own, but also its own power supply. However, since the capacity of accumulators is limited, an external power supply is also connected to the camera during stationary operation, if possible. A portable camera comprises additional electrical connections for this purpose.

As a rule, there are provided not only electrical connections for an external power supply and an external recording device, but also for a number of additional signals. These signals include, for instance, a separate viewfinder signal, an audio signal or a control signal for camera operation. Such control signals are inter alia a control signal for focus, aperture and a camera on/off signal. With the help of such signals, it is e.g. possible to realize a remote control of the camera so that shots are also possible without an operator being on the spot.

To be suited for both mobile and stationary use, broadcast cameras are provided on their bottom side with a shoulder support formed by an indentation in the central portion on the bottom side of the camera housing. FIG. 1 shows such a broadcast camera 2 which in the lower portion comprises a shoulder support 4. At the front and rear end of the bottom side of the camera housing, i.e. in front of and behind the indentation formed for receiving a shoulder, there are provided the sections which are mountable on a tripod plate and fixedly connectable to said plate. A broadcast camera is thereby suited for both mobile and stationary use.

To enable the camera to change very rapidly between a mobile use and a stationary use in the case of on-the-spot shooting, quick-action clamping plates are nowadays used as a rule for mechanically fixing the camera onto the plates very rapidly, but also for disconnecting the same again.

The tripod plate serves here as a mechanical interface between the camera and a pan head of the camera. Normally, such pan heads are positioned on a tripod, but can just as well be secured to a camera crane or another mechanical support device. The rotatable pan heads permit camera pans and tilts in a controlled manner.

With conventional (quick-action clamping) tripod plates, a portable camera can rapidly be mounted on and fixed to a pan head and also be detached therefrom again. Whenever the camera is mounted, it must be connected to all external lines in addition to its mechanical fixation to the tripod plate. Accordingly, when the camera is removed, it is not only the mechanical mounting that has to be detached, but all of the connected lines have to be disconnected again for a mobile use of the camera.

For securing a camera a conventional tripod plate is provided in its front portion with a dovetail guide into which an insertion member formed complementary thereto is introduced during mounting of the camera on the tripod plate. The camera is subsequently fixed onto the tripod plate with the help of a locking means. Such a tripod plate is e.g. known from DE-U1 256 13 027. In view of the size of the camera and its weight, a person can only introduce the insertion member at the bottom side of a portable camera under great difficulties. The reason is that the insertion member must be accurately "threaded" into the dovetail guide and does not allow for an inaccurate positioning of the camera on the tripod plate.

While being mounted and locked, a camera is first seated on the tripod plate in a mechanically fixed manner. However, even a minimum wear of the fastening device on the tripod plate or camera may lead to a play and thus to a rocking movement of the camera on the tripod plate.

BRIEF DESCRIPTION OF THE INVENTION

Said drawback is overcome by tripod plates which allow a separate clamping action. The fixed camera is additionally preloaded by a manually operated lever mechanism on the tripod plate, so that the camera itself will no longer shake or rock in the fastening device when there is a minimal play. Such a two-stage fastening to a tripod plate has however the effect that a portable camera cannot be used in a very flexible way. A change from a mobile to a stationary use is accompanied by a multistage locking and clamping procedure.

It is the object of the present invention to provide a tripod plate, a tripod, a portable camera and a connection element for an easier and faster mounting of the camera on a tripod plate.

The invention is based on the idea to simplify the mounting of a camera on a tripod plate. To this end, a camera is first mounted with only one end on the tripod plate. The camera is held at said end of the tripod plate in such a manner that it can perform substantially only a rotational movement around the holding point for mounting the other end on the tripod plate. Upon mounting of the opposite end the camera is finally fixed by means of an automatic locking means.

According to an advantageous embodiment of the invention the camera is fixed and clamped at the same time. A mechanical preload is created by a preloading means upon mounting of the camera so that the camera is fixedly clamped onto the tripod plate by the mechanical preload between the tripod plate and the camera. The production of such a load no longer requires the manual operation of a lever. While the camera is being mounted, a preload is automatically produced via the lever "camera" by the rotational movement defined for the camera during insertion into a holding element of the tripod plate. Instead of two successive stages, only one is now required. The reason is that the preload is produced in that the camera can only be mounted against the pressure of the preloading means. According to the invention a camera is thereby automatically locked and clamped on a tripod plate in an easy way.

Thus a person can mount the camera rapidly and reliably on the tripod plate of the invention without any awkward handling.

Moreover, the camera need no longer be mounted as a whole and in a positionally accurate manner on the tripod plate. First of all, only a projection of the camera is hooked in at the front end of the tripod plate. Even under adverse conditions such an insertion can be accomplished much more easily than a positionally accurate mounting of the whole camera on the tripod plate.

The tripod plate is equipped with a preferably cylindrically shaped bolt as the holding element. The bolt represents the rotational axis for the camera. A rotational movement of the camera is thereby supported by the shape of the bolt.

The camera can be mounted in a particularly easy way if it comprises two lateral projections that are cooperating with correspondingly arranged bolts as the axis of rotation. To this end the bolts are laterally arranged in respective recesses on the tripod plate. The camera is thereby retained at said end without any cumbersome mechanical "threading" operation.

At the other end the tripod plate comprises a locking means which includes a slide, a locking element, a spring and a safety means. The locking element is fixedly connected to the slide so that the locking element can be moved via the slide for unlocking purposes. The slide and the locking element that are movably arranged on the tripod plate are under a preload which is moving both members into the "locking" state. The locking mechanism is held by a release mechanism in the "non-locked" state until release. In the "locked" state the slide releases a safety means which automatically prevents an unlocking of the camera. No additional operation is thus required for locking the camera on the tripod plate.

The release mechanism for the locking means is activated by pins that are provided on the upper side of the tripod plate in the area of the locking means. In the "nonlocked" state the movably arranged pins project from the tripod plate because of their preload. When a camera is mounted, the pins are pressed down, thereby releasing the locking mechanism which fixes the camera in said area. A fully automatic locking of the camera is thereby made possible.

A means which preloads the camera such that the camera cannot move within the fastening device, even despite a slight play, is provided for clamping the camera. To this end a plate which is acted upon by a spring from below is provided in the area of the bolt. Said plate is arranged at the side of the point of rotation on the tripod plate. After the nose has been hooked into the holding element, the camera is also mounted on the other rear end of the tripod plate via a rotational movement. Said rotational movement is only possible against the resistance of the preloaded plate. The nose of the camera or of the connection element which can be fastened to the camera is shaped such that the camera can only be inserted under a preload while being mounted. The preload can be produced in an easy manner with the help of a metal plate and spring elements arranged thereunder. The preload is preferably so high that the camera can just overcome the preload by its own weight during the rotational movement for the mounting of the rear end. As a result, the camera can very easily be mounted and locked on the other end. To this end the preload is normally about two to three times the weight of the camera.

A connection element is provided according to a further aspect of the invention. Said connection element can be fastened at its upper side by a fastening device to the bottom side of conventional portable cameras. At least one downwardly protruding nose is provided on the bottom side of the connection element. Said nose can be hooked into the bolt of the tripod plate. Preferably, a projection of the nose projects towards the front side of the camera. The camera is then first hooked with its front lower end into the holding element of the tripod plate. Subsequently, the camera is just lowered at its rear end onto the tripod plate.

The connection element may be designed such that it comprises two noses respectively arranged at the side. To this end the connection element consists essentially of three components, namely a cover plate with the fastening device for a camera on the upper side, and two side elements. At their front lower end said side elements comprise projections and additionally effect a "rolling" of the camera upon mounting on the tripod plate, whereby the preload is built up. After the hooking action the camera is bound to rotate for mounting the other end of the camera due to two lateral elements on the connection element with the projections on the front lower end thereof. The camera can thereby be "threaded" and mounted on the tripod plate in an easy manner.

A further aspect of the invention relates to an interface system which consists of a tripod plate according to the invention and a connection element of the invention. The cooperation of the two components permits a fast mounting and clamping of the camera, the tripod plate being useable with the help of the connection element also for those cameras that originally have not been intended for the tripod plate according to the invention.

According to a further aspect of the present invention a fast change between a mobile and a stationary use of a portable camera is rendered possible in that an electrical interface is provided in addition to the mechanical interface permitting a fast mechanical change. An electrical interface which is coupled with the mechanical interface makes it possible that an electrical connection is established at the same time as the mechanical connection and can also be disconnected again.

To this end all of the camera connections, or at least the most important ones, such as the power supply and the video signal, are guided across electrical contacts preferably provided on the bottom side of the camera and on the upper side of the tripod plate. While the camera is being mounted on the tripod plate, the respective contact elements are automatically contacted, thereby permitting a transmission of electrical signals between the camera and the tripod plate. To this end the electrical contacts on the bottom side of the camera are internally or externally connected to the corresponding camera connections, and the contact elements on the upper side of the tripod plate to the corresponding electrical connection lines of the external devices. The connectors/sockets of the respective connections can directly be arranged on the surface of the sides of the tripod plate or inside the tripod plate. Finally, in the case of an arrangement inside the tripod plate, the connectors/jackets are advantageously flush with the side surface of the tripod plate. The connections can also be led out of the tripod plate at the side via cables.

An electrical contact can thus be established at the same time as the mechanical connection, so that a change from the mobile use to a stationary use on a pan head or on a tripod can now be carried out much faster than in former times.

For this purpose tripod plates are equipped on their upper side with corresponding contact elements. At the same time, the cameras are provided with correspondingly arranged contact elements on their bottom side.

Preferably, the contact elements of the camera are provided on the bottom side of the connection element so that they can be brought into contact with the corresponding contact elements of the tripod plate upon mounting. To permit an electrical connection with the corresponding camera connections, electrical connections that can each be connected to the corresponding camera connections are therefore provided on the outsides of the connection element. The electrical connections of the connection element are designed either as sockets/connectors that are directly arranged on the side surface of the connection element, or they are led out of the side surface of the connection element via cables. Advantageously, depending on the cable assignment, the cables have the corresponding connector (socket) and the necessary length to be directly connectable to the corresponding connection on the camera or the lens.

This provides for an interface device in the case of which, on the one hand, the camera is equipped with a connection element that comprises contact elements on its bottom side and, on the other hand, a tripod plate is provided with correspondingly arranged contact elements on the upper side. Thanks to said combination such an interface device improves the formerly known interface devices that have only been of a mechanical type.

Portable broadcast cameras are provided on their bottom side with a recess for placing the camera in an improved manner on an operator's shoulder. Thus, when the camera is mounted on a tripod plate, it is only the front and rear section of the bottom side of a camera that is in contact with the tripod plate. Electrical contact elements may be provided in the area of the front and rear sections. Advantageously, the contacts are provided in the front section. It is thereby possible to provide mechanical elements in the rear portion for locking the camera.

In general, a pan head of a camera is provided with a swing arm for moving the camera. The handle of said swing arm is equipped with an setting means for controlling the zoom setting of the camera. Apart from the power supply and the video signal produced by the camera, the zoom control signal thus belongs to the essential electrical signals for which electrical contact elements are provided on the bottom side of the camera or the bottom side of the connection element and on the upper side of the tripod plate. With minimum efforts for the interface, as much time as possible can be saved because it is only in exceptional cases that further lines are connected to the camera during stationary use.

Advantageously, further setting signals, such as focus setting and aperture setting of the camera, and an audio signal produced by the camera are transmitted via additional electrical contact elements.

Broadcast cameras are all the more suited for a mobile use the smaller their weight and their dimensions are. It is therefore desired to limit the number of the components provided in the camera just to the really necessary ones. However, when specific components are to be positioned somewhere else, these must be provided for as external accessory devices. This makes the camera not only more inconvenient during stationary operation, but also requires much more time for cabling. The number of accessory devices should therefore be limited to a minimum.

According to a further aspect of the present invention accessory means are therefore arranged inside the tripod plate. This has the special advantage that said additional components are electrically connected to the tripod plate at the same time. A separate cable laying is no longer required.

The possibilities of using a portable camera can thus be further improved by said measure without any extra work.

Advantageously, a distributing means is provided in the tripod plate. This distributing means makes it possible to pass a video signal to several external connections at the same time.

In particular, signal processing means may be arranged in the tripod plate according to the invention. As a result, video signals which are produced by the camera can e.g. be converted into a different video signal format. In view of the many possible signal formats, hardware components provided for different video formats (e.g. of different manufacturers) can easily be combined with one another.

According to a further aspect of the invention digital recording means can be arranged in the tripod plate. Video signals of the camera can e.g. be recorded on hard disks, as are used in commercial PCs. While such hard disks can normally not be accommodated in portable cameras because of the shocks produced, the recording capacity of a broadcast camera can considerably be increased with such an arrangement. Moreover, the electronic postproduction of the recorded video signals is rendered much more easier because a PC can directly access the signals stored on the hard disk for the postproduction of the video signals. A time-consuming recopying or rerecording to a hard disk is thus dispensed with. Moreover, electronic reporting is thereby facilitated, for image signals which are stored on a hard disk can be transmitted much faster and easier via a data network, e.g. the internet, to another place. Advantageously, the tripod plate is designed such that the digital recording medium in the tripod plate can be exchanged very easily. In particular those hard disks that are produced for notebook-like PCs are suited for digital recording. Other digital recording media of a smaller size can also be used, e.g., flashdisks which have the additional advantage that they are very sturdy from a mechanical point of view. These recording devices can also be used for control signals or parameters of/for the camera alone. In this case recording devices that are smaller and also more sturdy can be used without any problem.

According to a further aspect the tripod plate has arranged therein a receiving means which permits a remote control, in particular a wireless remote control, of the camera. A remote control is always advantageous whenever on account of external conditions, e.g. not enough space, or because of special environmental conditions, or when several cameras are operated from a central place, an operator cannot directly operate the camera. In such a situation there is normally also no space for an additional device. When such a receiving means can be accommodated within the tripod plate, the possibility of a remote control for broadcast cameras is considerably enhanced.

According to a further aspect the tripod plate contains a transmitting means for the wireless transmission of the video signal received by the camera.

Advantageously, the tripod plate is designed such that in response to the respective application it can be equipped with any desired electric device. To this end the tripod plate has provided therein a recess which can respectively receive modules of an identical size. Different modules with respectively different signal processing devices are provided for different applications; for instance, the above-mentioned electronic means which according to the invention can be arranged in the tripod plate. Such a tripod plate can then be used in a particularly flexible manner.

According to a further aspect of the invention the opposite electrical contact elements of the camera or of the connection element, and the tripod plate are designed differently. While the contact elements of the one side may e.g. be designed as flat contacts, the opposite electrical contact elements are movable substantially in a direction perpendicular to the surface, so that said contact elements are mechanically preloaded and therefore project from the surface. A simple and particularly sturdy contact with the opposite contact elements is thereby established.

Advantageously, the tripod plate or the camera contains a means which after the camera has been mounted on the tripod plate checks automatically whether a proper contact has been established with the contact elements. Thus contacting errors can be detected immediately, whereby a situation is avoided in which because of a faulty contacting an inadequate recording or no recording is carried out without this being noticed by the operator.

In particular, an optical display means which displays a positive and/or negative test result of a contact checking operation is provided on the tripod plate or on the camera. For instance, directly after mounting one can see whether the camera has been properly contacted and whether a recording operation can directly be continued from the tripod.

BRIEF DESCRIPTION OF THE DRAWINGS

Embodiments of the present invention shall now be explained with reference to the drawings, in which:

FIG. 8 is a top view on a front section of a tripod plate according to the invention;

FIG. 9 is a sectional view of a front section of a tripod plate according to the invention and of a camera with a connection element according to the invention upon mounting on the tripod plate;

FIG. 10 shows the section illustrated in FIG. 9, but with the camera fully mounted on the tripod plate;

FIG. 11 is a longitudinal section through a further embodiment of a camera plate designed according to the invention, with a connection element;

FIG. 12 is a top view on the tripod plate of FIG. 11;

FIG. 13 is a longitudinal section through a further embodiment of a tripod plate designed according to the invention, with a mounted camera;

FIG. 14 is a further longitudinal section through the tripod plate designed according to the invention as shown in FIG. 13; and FIG. 15 shows the individual stages of mounting a camera with a connection element designed according to the invention on a tripod plate designed according to the invention.

DETAILED DESCRIPTION OF THE INVENTION

Figure 1:
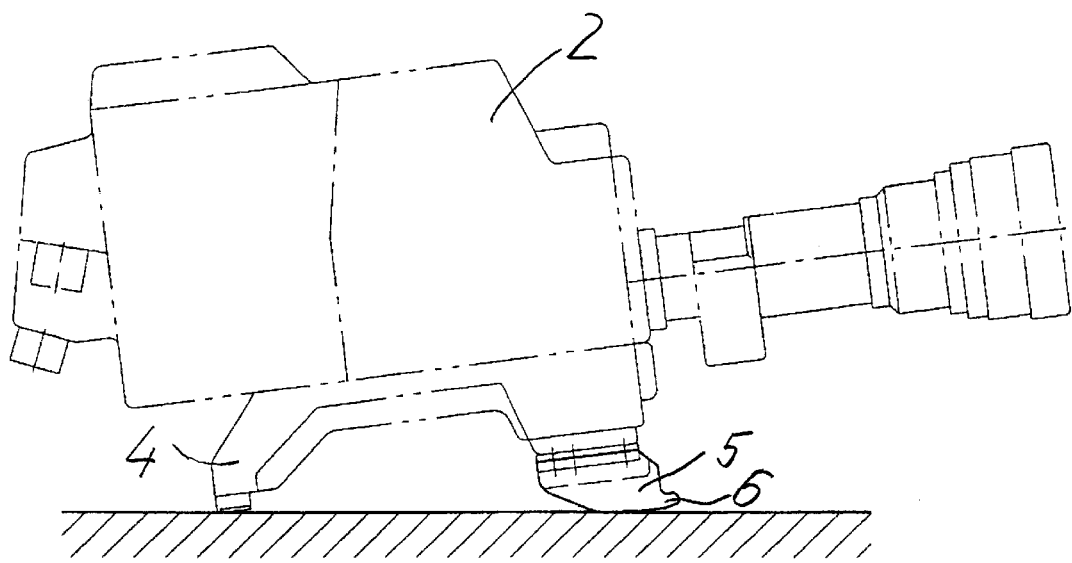
FIG. 1 shows a camera having a connection element designed according to the invention.

FIG. 1 is a side view of a portable camera 2. The camera 2 is equipped with a lens at its front side and with a shoulder support 4 at its bottom side. In the central portion between the front and rear ends of the camera housing, the shoulder support has a recess so that the camera can be better held on the shoulder during mobile use. When said camera is mounted on a tripod plate, only the front and rear portions that are positioned in front and behind the recess are mechanically secured to the tripod plate. On the front portion, i.e. at the bottom side of the camera, a connection element 5 which is designed according to the invention is fixedly connected to the camera 2. Said connection element allows a much faster mechanical mounting of the camera on the tripod plate 1.

A schematic diagram which illustrates the mounting of the camera 2 on the tripod plate 1 is shown in FIG. 15. To this end, the camera 2 which has secured thereto a connection element 5 designed according to the invention, as shown in FIGs. A and B of FIG. 15, is first hooked with a projection 6 of the connection element 5 into corresponding bolts 9 of the tripod plate 1. Subsequently, the rear end of the camera 2 is mounted on the tripod plate 1, as shown in FIG. C. To this end the camera is rotated in a rotational movement around the point of rotation of the holding element 9. A mechanical preload is created between camera and tripod plate by the rotational movement between the bottom side of the connection element 5 and the upper side of the tripod plate 1, which is designed accordingly at this place. After the camera has been mounted on the tripod plate, the rear end is mechanically and firmly connected to said plate so that the camera is locked onto the tripod plate.

Figure 2:
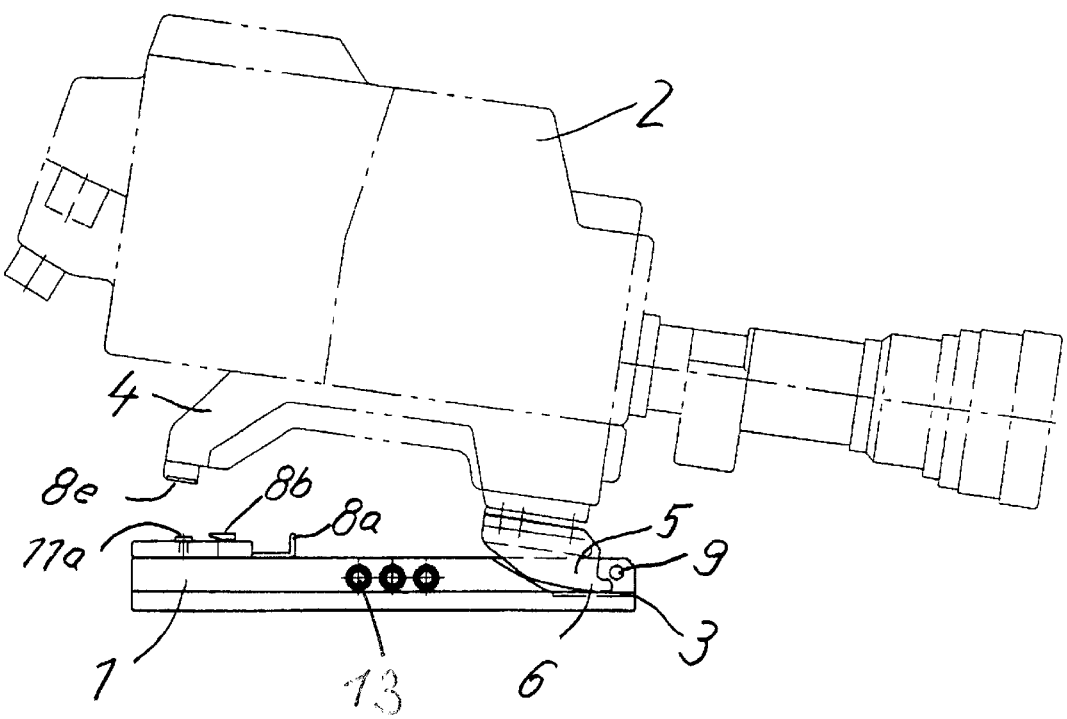
FIG. 2 shows a first stage of mounting the camera on a tripod plate designed according to the invention.
Figure 3:
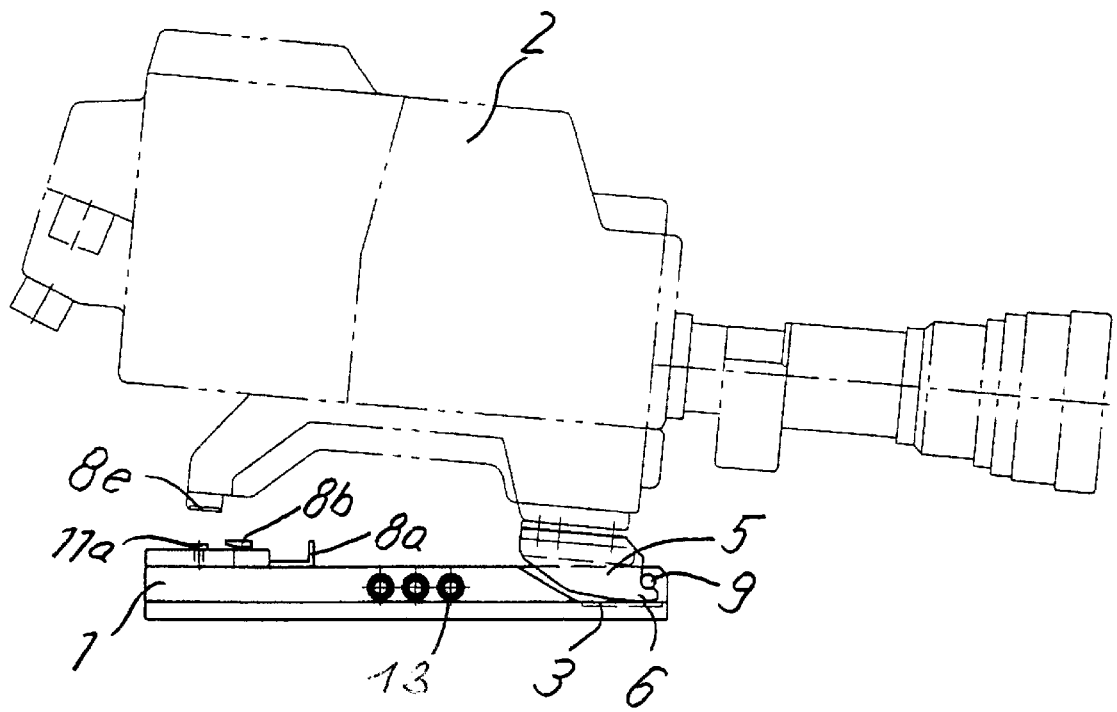
FIG. 3 shows a second stage of mounting the camera on the tripod plate.
Figure 4:
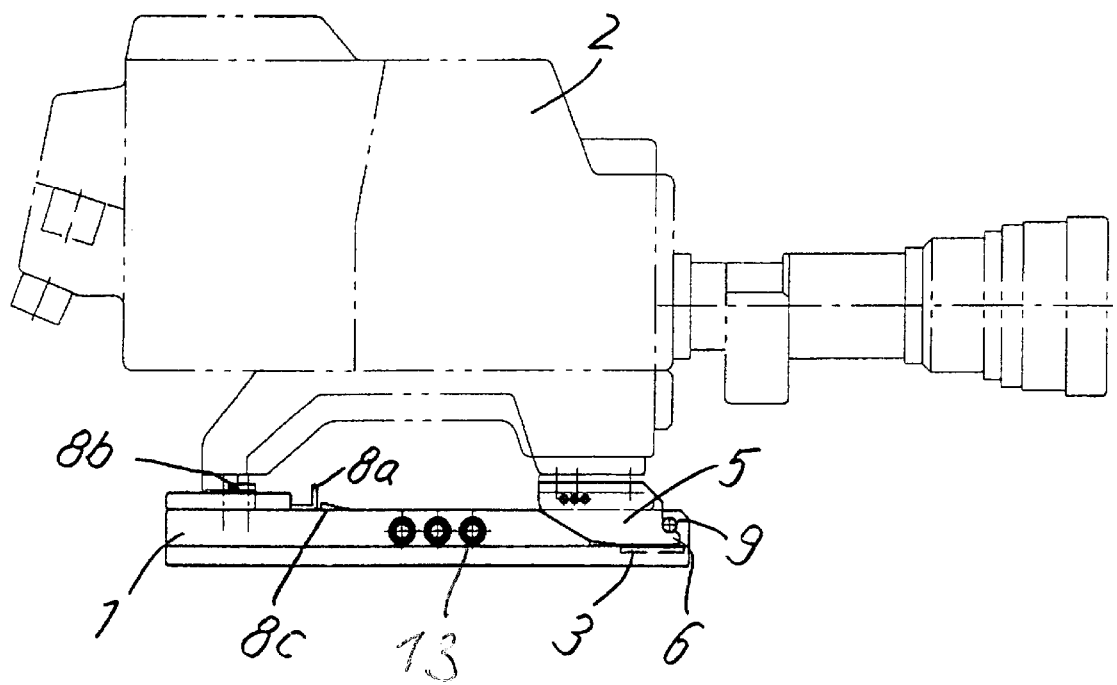
FIG. 4 shows the camera mounted on the tripod plate designed according to the invention.

The mounting operation is shown in detail in FIGS. 2 to 4. FIG. 2 shows a state in which the camera 2 is inserted in straight fashion into the tripod plate with the projections 6 of the connection element 5. The camera is here slightly tilted forwards so that the projections 6 of the connection element 5 can be slid more easily below the laterally projecting bolts 9. The locking device 8 can be seen at the rear end of the tripod plate 1. A means 3 for producing a preload is provided on the bottom side of the recessed front side sections, the recesses of the tripod plate 1.

In FIG. 3, the projections 6 of the connection element 5 are completely slid below the bolts or pins 9 of the tripod plate, and the camera is moved in a rotational movement towards the rear part of the tripod plate 1.

FIG. 4 shows the state in which the camera 2 is mounted on the tripod plate 1. During mounting of the camera the rear end of the camera is connected to the tripod plate in a mechanically fixed manner. To this end a slide 8a which is positioned on the tripod plate and which is rigidly connected to a locking element 8b is displaced such that the rear end of the camera is rigidly connected to the tripod plate. To this end the locking element 8b engages into a holding bracket 8e which is normally arranged on portable cameras and provided with an opening for a projecting part of the locking element 8b. Said sliding operation takes place automatically, i.e., when the rear part of the camera is put onto pins 11a of a release mechanism the camera is locked automatically. To prevent an inadvertent automatic release of the lock, a safety means 8c is additionally provided in the tripod plate. As long as the slide 8a is in the non-locked position, said safety means 8c is covered by the slide 8a. Since the safety means 8c is movably arranged within the tripod plate and under a mechanical preload acting in the direction of the upper side of the tripod plate, the means will project upwards from the tripod plate as soon as the slide 8a is in the "locked" position and releases the safety means 8c. The slide 8a can thus not be displaced by mistake into the "non-locked" position. The camera is thereby reliably and firmly connected to the tripod plate.

Each of FIGS. 2 to 4 shows three electrical connections 13 arranged approximately centrally on the outer surface of the tripod plate 1 that is facing the viewer. Corresponding signal lines are connectable to said connections, e.g. a power supply, a video signal line, lines for adjustment signals, such as zoom or aperture adjustment, or an audio signal. The signals supplied in the individual case via said lines to the electrical contacts can be varied as desired; also the number of electrical connections and the corresponding contact elements. The tripod plate or interface device designed according to the invention can thus be adapted to the respective needs.

Figure 5:
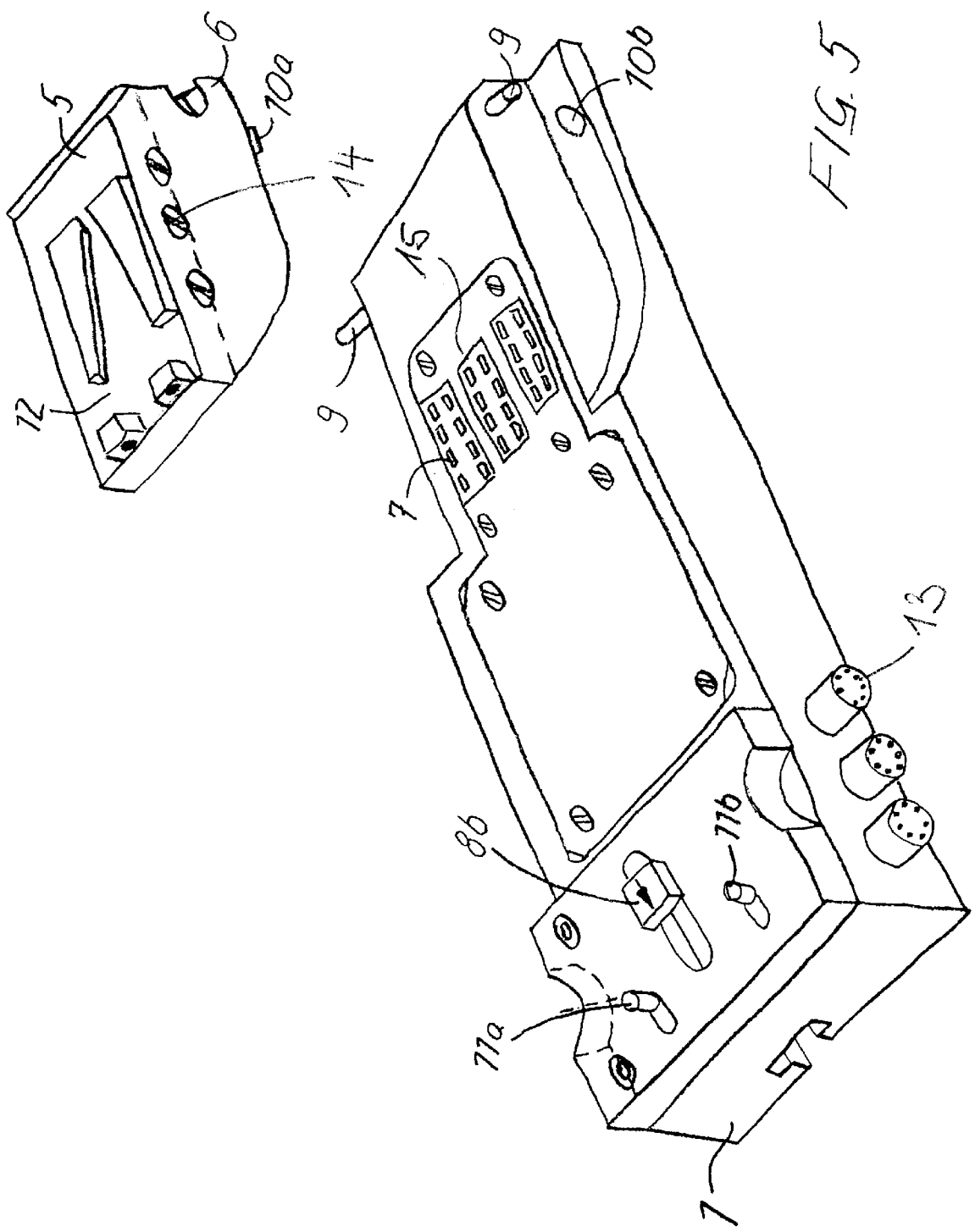
FIG. 5 is a perspective view of a tripod plate designed according to the invention and of a connection element designed according to the invention.

FIG. 5 is a perspective view of the inventive interface system consisting of tripod plate 1 and connection element 5. At its upper side the connection element 5 can be connected in a mechanically fixed manner to the bottom side of a front section of a camera. To this end the connection element 5 comprises a fastening device 12. The fastening device is designed such that it is connectable to the fastening device provided on the camera. As can be seen from the front portion of the tripod plate 1 formed complementary to said connection element 5, the connection element 5 consists essentially of three components: a cover plate which is arranged in parallel with the bottom side of the camera and provided at its upper side with the fastening device 12, and two noses that are arranged at the two sides in a direction perpendicular thereto and project towards the tripod plate 1. In this embodiment the projections 6 are created by recesses provided on the front side, which upon mounting of the camera grip around the laterally projecting bolts 9 in the tripod plate 1. The connection element 5 comprises contact elements below the cover plate (not visible here). Said contact elements serve to transmit electrical signals from the tripod plate to the camera, and vice versa.

At the side facing the viewer, three electrical connections 14 are provided on the connection element 5. The electrical contact elements are connected to the electrical connections 14 within the connection element 5. The electrical connections 14 can be connected to the respective electrical connections of the camera.

As can additionally be seen in FIG. 5, the connection element 5 in said embodiment comprises two downwardly projecting pins 10a which will snap into corresponding recesses 10b on the tripod plate 1 as soon as the camera has been mounted entirely.

At its end the tripod plate 1 comprises two cylindrically shaped pins or bolts 9 that are each oriented towards the side and hold the connection element upon mounting in the tripod plate. To this end the tripod plate comprises corresponding lateral recesses for receiving the laterally arranged noses of the connection element 5. However, it is e.g. also possible to provide only one nose and only one corresponding recess with a bolt.

The locking element 8b can be seen at the rear end of the tripod plate 1. The element is automatically displaced towards the rear side of the tripod plate for locking, i.e. fixing the camera. The locking element is here made larger on its upper side. A corresponding holding bracket 8e is thereby held at the rear end of the camera upon mounting. To permit an automatic locking action, the preloaded locking element 8b is released when the pins 11a and 11b of the release mechanism are pressed in, resulting in an automatic fixation of the camera.

Three electrical contact portions 15 can be seen on the surface of the tripod plate 1 in the front portion. Each of said contact portions 15 comprises eight electrical contact elements 7. Each of the contact elements 7 is movably arranged in the tripod plate 1 and slightly projects from the tripod plate. To this end each contact element 7 is mechanically preloaded, whereby it is pressed out of the tripod plate. By contrast, the correspondingly arranged contact elements of the connection element 5 are designed as flat contacts. Upon mounting of the connection element 5 the flat contacts will press against the Opposite electrical contacts 7. A reliable contact of the respectively opposite contact elements is established by the contact pressure. Upon mounting of the connection element 5 with the flat contact elements and when the movable contact elements 7 are pressed in, there will be a slight relative displacement of the opposite contact elements relative to one another, whereby proper contacting is ensured. The arrangement of the flat contacts and of the movable contact elements could be interchanged just as well.

The contact elements 7 of the tripod plate 1 are connected to electrical connections 13 arranged on the outside of the tripod plate. In the embodiment shown in said figure, three electrical connections can be seen that are arranged in the rear portion of the lateral outer surface of the tripod plate. In the present case a respective one of the electrical connections 13 within the tripod plate is connected to the electrical contact elements 7 of a respective one of the contact portions 15.

During stationary operation the tripod plate 1 is mounted on a pan head of the camera or on a tripod. To this end the tripod plate is fixedly connected at its bottom side to the upper side of the pan head of the camera or of the tripod.

Figure 6:
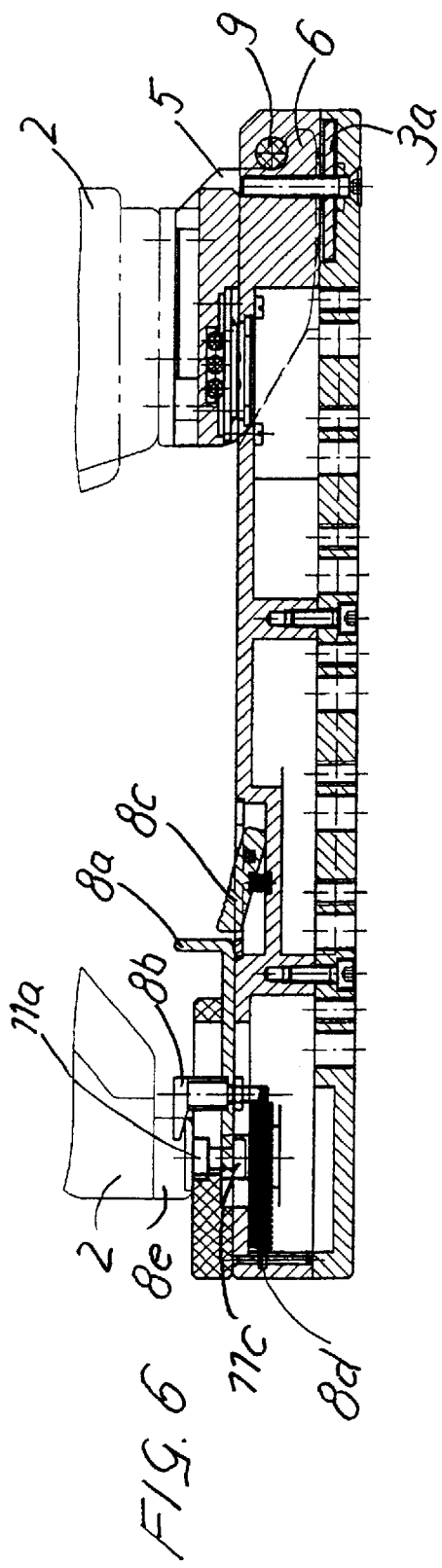
FIG. 6 is a longitudinal section through a tripod plate designed according to the invention with a camera mounted thereon.

Each of FIGS. 6, 11, 13 and 14 is a longitudinal section through different embodiments of the tripod plate. FIG. 6 shows part of a mounted and clamped camera 2. As in all figures, like reference numerals designate like elements. FIG. 6 shows the locking mechanism in a particularly clear manner. The slide 8a is fixedly connected to the locking element 8b. Both are preloaded by the spring element 8d. An automatic locking action is started by the release mechanism 11 releasing the movement of the slide 8a with the locking element 8b. In the "non-locked" position the element 11c of the release mechanism prevents the slide 8a with the locking element 8b from moving towards the rear end of the locking plate due to the preload. When the camera is put on the pins 11a, the latter are pressed into the tripod plate. During this operation the catch 11c of the release mechanism is also moving downwards, thereby releasing the movement for the locking mechanism.

Figure 7:
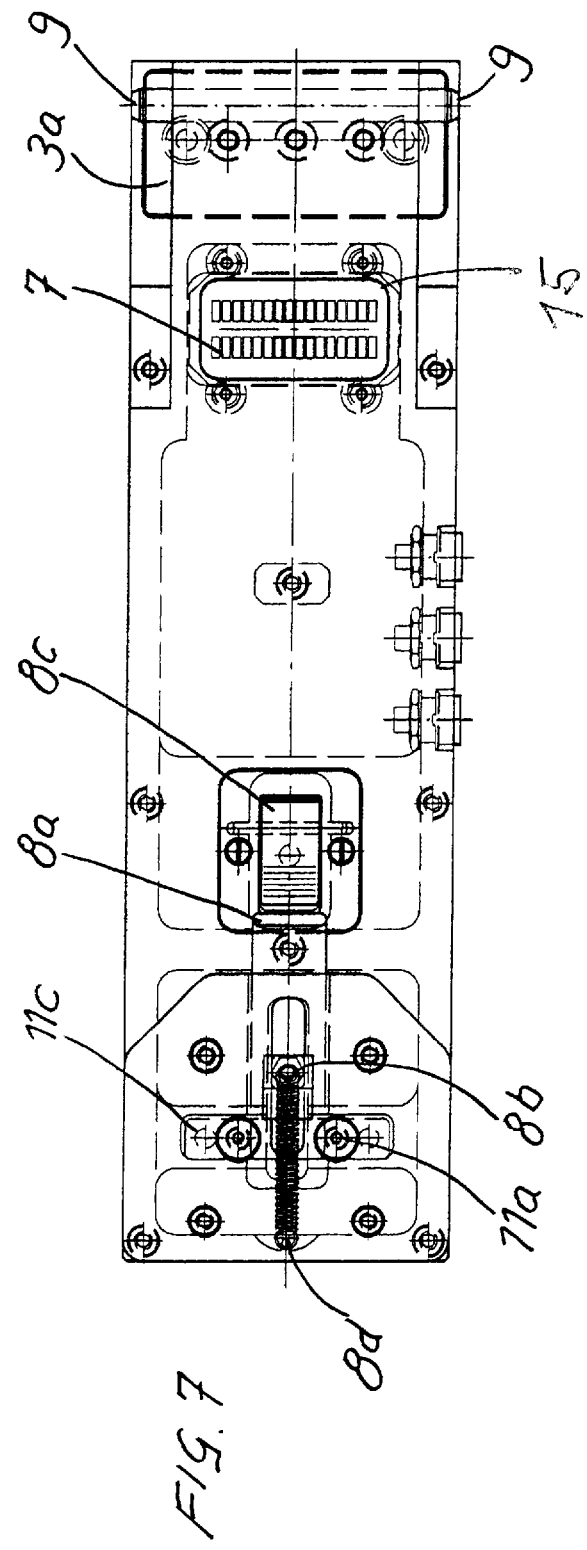
FIG. 7 is a top view on a tripod plate designed according to the invention.

FIG. 7 is a top view on the tripod plate which is designed according to the invention and shown in FIG. 6. The cylindrical bolts 9 can be seen in the front portion of the tripod plate 1. Below said holding means 9, the contours of a steel plate 3a can be made out, said steel plate 3a being pressed upwards by spring elements. A slight variant of the tripod plate is shown in FIGS. 11 to 14. As is in particular illustrated in FIGS. 11, 12, and 14, the mechanical reload is produced in the front portion of the tripod plate. Spring elements 3b which effect the mechanical reload are arranged below the steel plate 3a. The projection 6 of the connection element is pressed by the mechanical reload against the bolt(s) 9 in the mounted state of the camera. The camera is thereby fixedly clamped at its front end between the reloading means 3a, 3b and the bolt 9. Furthermore, FIG. 11 illustrates special pins 12 projecting upwardly from the tripod plate. These pins may be provided optionally and used for further engaging the connection element 5.

Alternatively, the preload is produced by corresponding spring elements which are not arranged in the tripod plate but are disposed in the connection element or a correspondingly designed camera. In these embodiments, a pressure is generated against the tripod plate. The preload produced is retained by the holding element 9.

The interface system which is designed according to the invention with a connection element and a tripod plate is not limited to the illustrated embodiments. It is possible to exchange the position of the connection element 5 and of the holding means 9 for the locking means 8. It is also possible to laterally mount the camera on the tripod plate so that the hooking operation takes place at the one side and the locking operation at the other side. The locking mechanism can here also laterally engage into the tripod plate.

Also shown in the front portion in FIG. 7 is another design for the arrangement of the contact elements 7 in a contact portion 15. While in FIG. 5 the contact elements have been arranged in three adjacent contact portions 15, with four contact elements being respectively provided one after the other in two rows per contact portion 15, FIG. 7 only shows one contact portion 15. In this case the contact elements are arranged in two rows extending in a direction perpendicular to the longitudinal direction of the tripod plate. Like in FIG. 5, the contact elements need not have a square shape, but may be of a rectangular configuration the longitudinal direction of which extends in parallel with the longitudinal direction of the tripod plate. The contact portion shown in FIG. 7 extends almost entirely over the whole width of the front section of the tripod plate. In this portion the usable part of the tripod plate is slightly smaller than the total width of the tripod plate because the tripod plate comprises lateral recesses for receiving the lateral noses of the connection element 5. The contact elements 7 could also be arranged in the rear portion of the tripod plate.

FIG. 8 shows a further embodiment of a tripod plate 1 of the invention. This tripod plate differs in the arrangement of the contact elements 15 from the previous embodiment. In contrast to the embodiment of FIG. 7, the contact elements 7 are arranged in three respective contact portions 15.

FIGS. 9 and 10 show a further embodiment of an interface system according to the invention. FIGS. 9 and 10 show a section through the front portion of the tripod plate and the front portion of the camera with the connection element 5. While FIG. 9 shows a state with the camera being mounted, FIG. 10 shows the state of a mechanical and electrical connection of the interface system. The electrical elements of the interface device are here shown with a darker shade. The portion of the electrical contact elements 7 can be seen on the upper side of the tripod plate 1. Both the portion of the contact elements 11 of the connection element 5 and the electrical connections 10 can be seen on the bottom side of the cover plate of the connection element 5 because of their darker shade. In the present embodiment, the electrical contact elements of the tripod plate 1 are designed as flat contacts and the electrical contact elements 11 of the connection element 5 project out of the cover plate of the connection element 5 because of a mechanical preload.

FIG. 10 shows a state in which an electrical connection is established. The contact elements 11 are properly connected to the correspondingly arranged opposite contact elements 7. In this state any desired electrical signals can be transmitted via the electrical interface from the electrical connections 15 of the tripod plate to the electrical connections 14 of the connection element on the camera. With a corresponding connection of the electrical connections 14 to the respective camera connections and of the connections 15 of the tripod plate 1 to the respective external devices, the mounting of a camera 2 on a tripod plate 1 can be sped up considerably. Immediately after the mounting operation the recording operation can be continued.

What is claimed is:

1. A tripod plate which is connectable to a camera and a tripod, comprising:

a locking means at a first end in the longitudinal direction of the tripod plate for mechanically locking the camera to the tripod plate, and at least one recess at a second opposite end of said tripod plate and including a bolt arranged in a direction transverse to the longitudinal direction of said tripod plate, said recess configured for receiving a connecting member secured to an end of the bottom side of a camera, and in cooperation with the connecting member allows substantially only a rotation of the camera around said bolt as the axis of rotation, said locking means locking the camera and said tripod plate upon mounting of the opposite end of the bottom side of the camera.

2. The tripod plate according to claim 1, further comprising:

electrical contact elements on the upper side of said tripod plate for transmitting electrical signals via correspondingly arranged contact elements on the bottom side of a camera which is mechanically fixedly connectable to said tripod plate, and electrical connections on at least one outer side of said tripod plate and connected with said electrical contact elements.

3. The tripod plate according to claim 1, wherein two recesses are each arranged laterally at the front end of said tripod plate, and said bolt is cylindrical and can project into each of said recesses.

4. The tripod plate according to claim 1, further comprising means for producing a mechanical reload in a direction substantially perpendicular to the surface of said tripod plate, so that a camera can be firmly clamped under a reload onto said tripod plate.

5. The tripod plate according to claim 1, wherein said locking means comprises:

a locking element to engage into a correspondingly arranged opening on a bottom side of the camera, a slide connected to said connection element and which together with said locking element is movably arranged in said tripod plate, a resilient element, for producing a mechanical reload on said slide and said locking element, so that said slide and said locking element are pulled into a locked position, a release mechanism to block and release a movement of said reloaded slide and said locking member, and a safety means to prevent movement of said slide and said locking element into a non-locked position when said slide and said locking element are in the locked position.

6. The tripod plate according to claim 1, further comprising:

at least one pin arranged in the portion of said locking means, said pin being movable in a direction perpendicular to the surface of said tripod plate and being reloaded such that said pin projects from the surface of said tripod plate and can be pressed in during mounting of a camera, said pin releasing said reloaded locking means via a release mechanism so that a mountable camera can be locked automatically.

7. The tripod plate according to claim 4, wherein said means for producing a mechanical reload is arranged in said tripod plate and comprises:

a plate with which the mechanical reload can be exerted on a connecting member secured to a mountable camera, and a spring element arranged below said plate which exerts a mechanical reload on said plate.

8. The tripod plate according to claim 7, wherein the reload is about two to three times the weight of a camera to be mounted on said tripod plate.

9. A camera tripod comprising a tripod and a tripod plate secured to the upper side thereof for rapidly mounting a camera, wherein the tripod plate is designed according to any one of claims 1 to 8.

10. A portable camera which is designed at its bottom side such that it is mountable on a tripod plate, comprising:

at least one connecting member at an end of the bottom side of the camera designed to fit into a recess in a tripod plate and cooperates with a recess and a bolt arranged in said recess in a direction transverse to the longitudinal direction of the tripod plate, for allowing substantially only a rotation of the camera around the bolt as the axis of rotation while the camera is being mounted on the tripod plate.

11. The portable camera according to claim 10, further comprising:

electrical contact elements on the bottom side of the camera for transmitting electrical signals via correspondingly arranged electrical contact elements on the upper side of a tripod plate which is connectable to the camera.

12. The portable camera according to claim 11, wherein said camera is only provided in the front and rear portions of its bottom side with a section that is connectable to the tripod plate, and said camera electrical contact elements are arranged both in said front portion and in said rear portion.

13. A connection element which can be fastened to a bottom side of a camera for rapidly connecting a camera to a tripod plate, comprising:

a fastening device provided on the upper side of the connection element for fastening the connection element to the bottom side of a camera, and at least one connecting member on the bottom side of said connection element to fit into a recess in the tripod plate and cooperate with a said recess and with a bolt arranged in said recess in a direction transverse to the longitudinal direction of the tripod plate, for allowing substantially a rotation of the camera only around said bolt as the axis of rotation while the camera is being mounted on the tripod plate.

14. The connection element according to claim 13, further comprising:

electrical contact elements on the bottom side of the connection element for transmitting electrical signals via correspondingly arranged contact elements on the upper side of a tripod plate which is connectable to the connection element, and electrical connections on at least one outer side of the connection element and are connected within the connection element to the electrical contact elements.

15. The connection element according to claim 13, wherein said connecting member comprises two noses arranged in parallel and respectively provided at a side of said connection element.

16. An interface system for establishing a fast mechanical connection between a camera and a tripod, comprising:

a connecting member which can be fastened to a bottom side of a camera and comprises at least one nose, and a tripod plate, according to claim 1.

* * * * *